(12) United States Patent
Schreier et al.

(10) Patent No.: US 6,358,175 B1
(45) Date of Patent: *Mar. 19, 2002

(54) CONTROLLED TRACTION CARTRIDGE AND DIFFERENTIAL FOR A HYDROSTATIC TRANSMISSION

(75) Inventors: John Schreier, Charleston, IL (US); Matthew Hansen, Minneapolis, MN (US); Todd Horton, Spring Hill, TN (US); Ron Sporrer, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 90 days.

This patent is subject to a terminal disclaimer.

(21) Appl. No.: 09/684,158

(22) Filed: Oct. 6, 2000

Related U.S. Application Data

(63) Continuation of application No. 09/334,050, filed on Jun. 15, 1999, now Pat. No. 6,152,846, which is a continuation of application No. 09/104,868, filed on Jun. 25, 1998, now Pat. No. 5,984,822, which is a continuation of application No. 09/698,650, filed on Aug. 16, 1996, now Pat. No. 5,897,452.

(51) Int. Cl.[7] .............................................. F16H 47/00
(52) U.S. Cl. ........................................................ 475/83
(58) Field of Search .......................... 475/83, 231, 233

(56) References Cited

U.S. PATENT DOCUMENTS

| | | |
|---|---|---|
| 1,446,545 A | 2/1923 | Brush et al. |
| 2,354,214 A | 7/1944 | Lockwood |
| 2,985,035 A | 5/1961 | Toth |
| 3,029,661 A | 4/1962 | Schmitter |
| 3,092,983 A | 6/1963 | Huber |
| 3,528,323 A | 9/1970 | Kamlukin |
| 3,915,032 A | 10/1975 | Ottemann |
| 3,916,728 A | 11/1975 | Behar et al. |
| 4,050,534 A | 9/1977 | Nelson et al. |
| 4,077,279 A | 3/1978 | Goscenski, Jr. |
| 4,238,013 A | 12/1980 | Goscenski, Jr. |
| 4,280,375 A | 7/1981 | Goscenski, Jr. |
| 4,290,321 A | 9/1981 | Wilson |
| 4,389,909 A | 6/1983 | Goscenski, Jr. |
| 4,809,560 A | 3/1989 | Nemoto |
| 4,838,118 A | 6/1989 | Binkley |
| 4,862,767 A | 9/1989 | Hauser |
| 4,888,539 A | 12/1989 | Estabrook et al. |
| 4,930,367 A | 6/1990 | Nagasawa |
| 4,973,296 A | 11/1990 | Shibahata |
| 5,007,886 A | 4/1991 | Holmquist et al. |
| 5,019,021 A | 5/1991 | Janson |
| 5,055,095 A | 10/1991 | Osenbaugh et al. |
| 5,092,825 A | 3/1992 | Goscenski, Jr. et al. |
| 5,201,692 A | 4/1993 | Johnson et al. |
| 5,269,731 A | 12/1993 | Scudder et al. |
| 5,314,387 A | 5/1994 | Hauser et al. |
| 5,339,708 A | 8/1994 | Nakamura |
| 5,342,255 A | 8/1994 | Slesinski et al. |
| 5,484,347 A | 1/1996 | Holmquist |
| 5,584,777 A | 12/1996 | Sander et al. |
| 5,807,200 A | 9/1998 | Hauser |
| 5,863,271 A | 1/1999 | Schreier et al. |
| 5,897,452 A | 4/1999 | Schreier et al. |
| 5,899,826 A | 5/1999 | Schreier et al. |
| 5,984,822 A | 11/1999 | Schreier et al. |

*Primary Examiner*—Dirk Wright
(74) *Attorney, Agent, or Firm*—Thomas C. McDonough; Gary R. Jarosik

(57) ABSTRACT

An integrated hydrostatic transaxle including a housing in which is mounted a hydrostatic transmission having a hydraulic pump unit and a hydraulic motor unit with a motor shaft drivingly connected thereto. A differential assembly is drivingly linked to the motor shaft and is used to drive output axle shafts of the transaxle. The differential assembly includes a rotatable gear which is maintained in frictional engagement with at least one bearing surface for frictionally inhibiting the rotational movement thereof.

13 Claims, 7 Drawing Sheets

CONTROLLED TRACTION CARTRIDGE AND DIFFERENTIAL FOR A HYDROSTATIC TRANSMISSION

CROSS REFERENCE OF RELATED APPLICATIONS

This application is a continuation of U.S. Ser. No. 09/334,050 filed Jun. 15, 1999; now, U.S. Pat. No. 6,152,846, which is a continuation of U.S. Ser. No. 09/104,868, filed Jun. 25, 1998, now U.S. Pat. No. 5,984,822; which is a continuation of U.S. Ser. No. 09/698,650 filed Aug. 16, 1996, now U.S. Pat. No. 5,897,452.

FIELD OF THE INVENTION

This invention relates generally to transaxles and, more particularly, relates to a controlled traction cartridge for use in providing a controlled traction differential.

As is known, the use of a standard differential assembly in the transmission system of a motor vehicle allows the wheels to spin at different speeds. In the case of a vehicle traveling in a straight line, the axle shafts connected to the standard differential assembly will rotate at the same speed. However, when a turn or curve is encountered, the axle shaft nearest the inside of the turn will slow in rotational speed while the outer axle shaft will simultaneously increases in rotational speed. As such, the wheels, driven by the axle shafts, are prevented from scuffing the surface across which they travel.

While the standard differential assembly serves an important function in the operation of a transmission system, the standard differential of simple construction has difficult operating under certain conditions. For example, when a first one of the drive tires is disposed in wet, muddy, or loose soil conditions, or when the first drive tire has been partially or completely removed from contact with the ground, the coefficient of friction under the first drive tire will be substantially lower than that associated with the second drive tire. This resulting frictional imbalance will tend to cause the second drive tires to remain stationary while the first drive tire will spin without moving the vehicle.

To solve the problem of loss of traction in larger transaxle systems, a variety of techniques have been developed to reduce the tendency of the transaxle to differential. For example, U.S. Pat. No. 3,528,323 to Kamlukin, issued Sep. 15, 1970, discloses a means for preventing free spinning of one of the driven shafts of a transaxle without interfering with the normal differential capability of the transaxle. In particular, the '323 patent discloses the use of a coil spring to outwardly force the gears of the differential into engagement with the differential housing thereby introducing a frictional force into the assembly which acts to resist relative rotation of the axle shafts. In this manner, the frictional force limits the free spinning of one axle shaft while the other remains stationary.

While the friction inducing means disclosed in the '323 patent works for its intended purpose to provide larger transaxles with a controlled traction differential assembly, the use of coil springs to apply the frictional force often requires special tools and/or procedures for use in applying the forces necessary to set the springs. These additional tools and/or procedures undesirably results in increased manufacturing costs. Therefore, there remains a need for a controlled traction differential assembly which is simpler to construct, can be produced at a lower cost, and which can be readily incorporated into a smaller transaxle such as an integrated hydrostatic transaxle.

As a result of these existing needs, it is an object of the present invention to provide an integrated hydrostatic transaxle having a controlled traction differential assembly which will provide the hydrostatic transaxle with the benefits and advantages which have accrued to other types of transaxles that use controlled traction differential assemblies.

It is a further object of the present invention to provide a controlled traction differential assembly which is cost effective and relatively easy to manufacture.

It is still a further object of the present invention to provide a controlled traction cartridge for use in conveniently converting a standard differential assembly into a controlled traction differential assembly.

It is yet a further object of the present invention to provide a controlled traction differential assembly in which the breakdown bias, i.e., the amount of torque required to cause the differential to operate, may be easily varied.

SUMMARY OF THE INVENTION

In accordance with these objects, an integrated hydrostatic transaxle is provided. Generally, the transaxle comprises a hydrostatic transmission including a center section on which is supported a hydraulic pump unit and a hydraulic motor unit and a motor shaft drivingly connected to the hydraulic motor unit. A differential assembly is drivingly linked to the motor shaft for use in driving a pair of axle shafts. The differential assembly comprises a pair of gears rotatable with respect to each other and a friction inducing means for use in frictionally inhibiting the movement of at least one of the pair of gears with respect to the other of the pair of gears. In this manner the frictional force applied to the gear prevents normal operation of the differential when the drive tires mounted upon the axle shafts are under conditions of frictional imbalance.

More specifically, the differential assembly includes a pair of gears rotatable with respect to each other which are both disposed between an interior and an exterior bearing surface. The interior and the exterior surfaces are compressed against the pair of gears to maintain the gears in frictional engagement therewith thereby inhibiting the rotational movement of the pair of gears with respect to one another. In a preferred embodiment of the invention, the interior bearing surface is provided by forming at least one shoulder on a cross shaft which supports the pair of gears and the exterior bearing surface is provided by a pair of bearing blocks.

A better understanding of the objects, advantages, features, properties and relationships of the invention will be obtained from the following detailed description and accompanying drawings which set forth an illustrative embodiment and is indicative of the various ways in which the principles of the invention may be employed.

In accordance with these objects, the invention resides in a controlled traction cartridge for use in connection with a differential. The cartridge generally comprises a shaft, a gear mounted on the shaft and rotatable with respect thereto, and an interior bearing surfaces associated with the shaft. The gear is maintained in frictional engagement with the interior bearing surface for inhibiting the rotation of the gear.

More specifically, the invention resides in a differential and cartridge for use therein which comprises a hollow shaft supporting a pair of interior bearing surfaces, a pair of bearing blocks carried by the shaft, and a pair of gears mounted on the shaft and rotatable with respect to each other. The gears are each disposed in frictional engagement with a corresponding one of the bearing blocks and a corresponding one of the interior bearing surfaces. A nut and bolt assembly is disposed through the shaft and is used to maintain the frictional engagement between the pair of bearing blocks, the pair of gears, and the pair of interior bearing surfaces.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the preferred embodiment shown in the following drawings in which.

DETAILED DESCRIPTION

Figure 1:
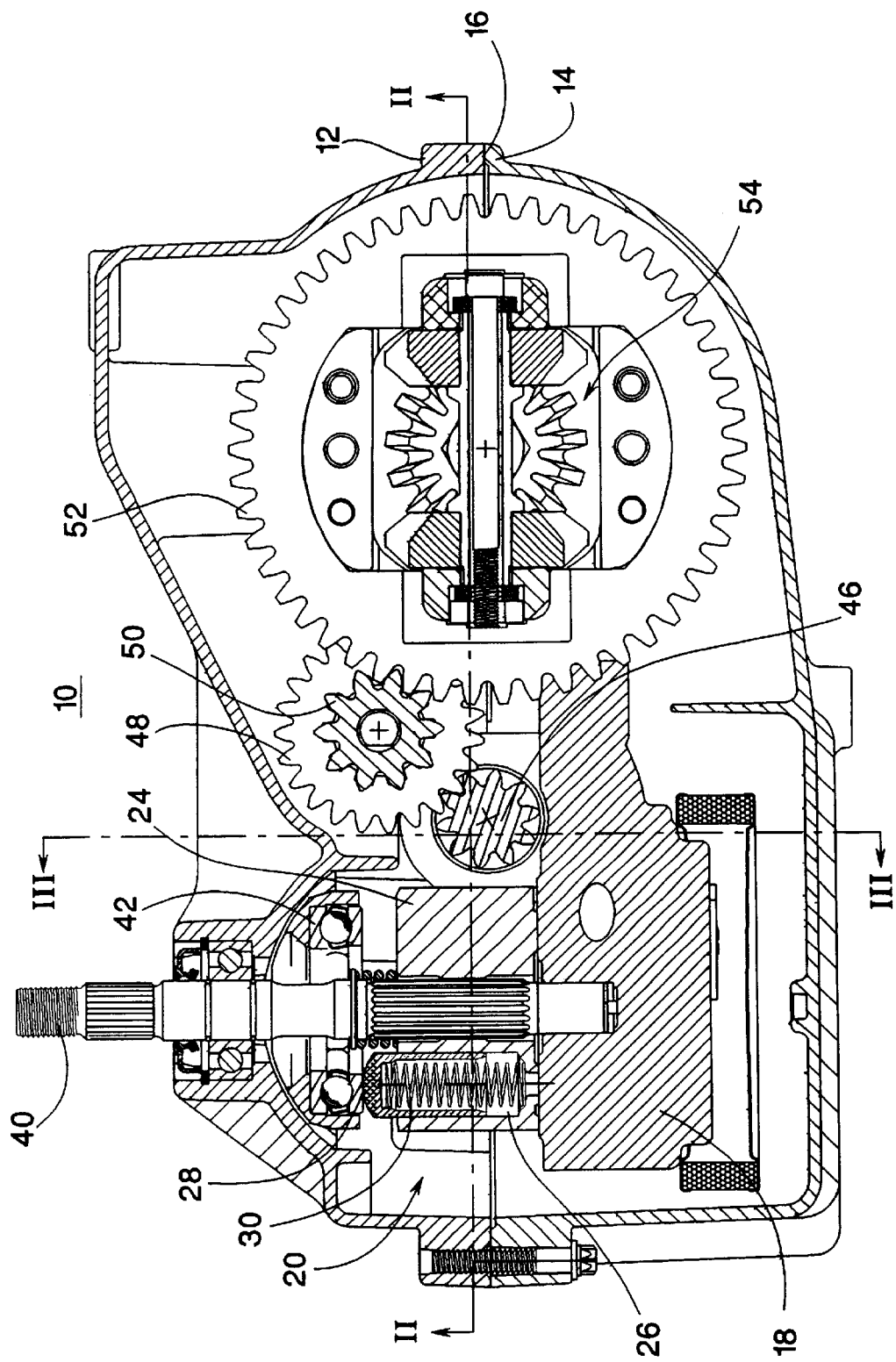
FIG. 1 illustrates a sectional side view of an integrated hydrostatic transaxle having a controlled traction differential assembly in accordance with the present invention.
Figure 2:
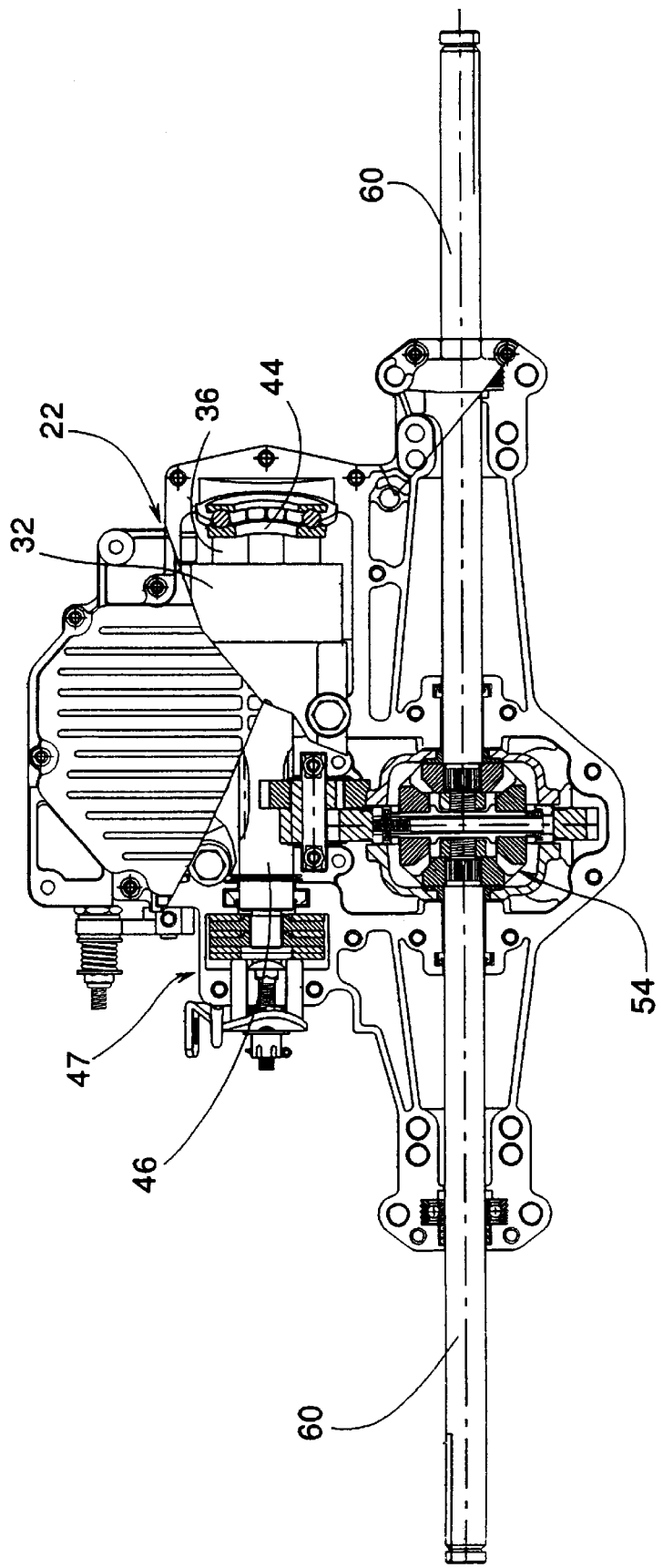
FIG. 2 illustrates a partial sectional bottom plan view of the integrated hydrostatic transaxle taken along line II—II in FIG. 1.
Figure 3:
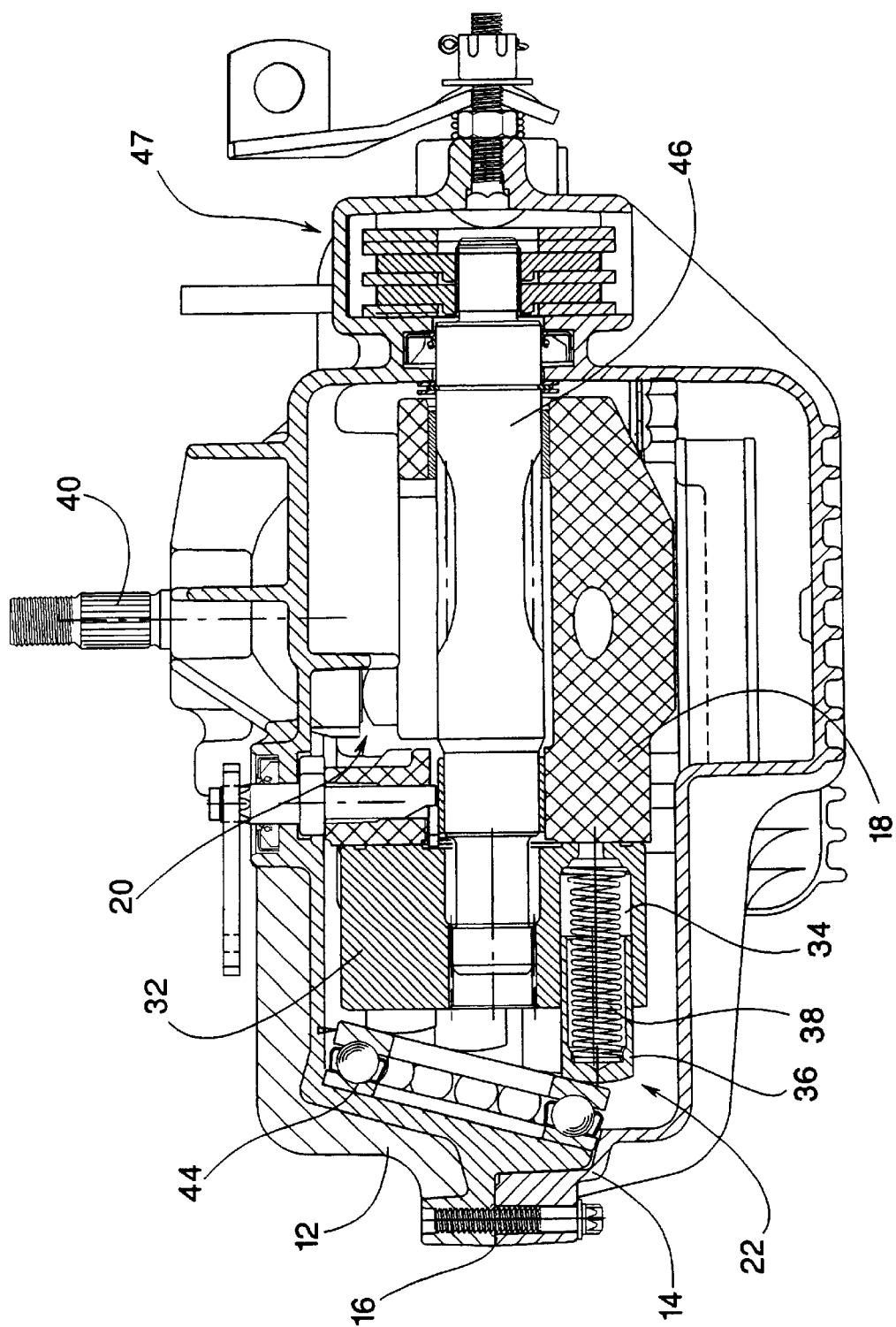
FIG. 3 illustrates a sectional side view of the integrated hydrostatic transaxle taken along line III—III in FIG. 1.

While the invention can be used in connection with most types of transaxles it will be described hereinafter in the context of an integrated hydrostatic transaxle ("IHT") as the preferred embodiment thereof.

Referring now to the figures, wherein like reference numerals refer to like elements, there is generally illustrated an IHT 10. While a brief description of the general construction and operation of the IHT will follow, the reader is referred to U.S. Pat. Nos. 5,201,692 and 5,314,387, which patents are hereby incorporated by reference in their entirety, for a more thorough discussion of this subject matter.

As illustrated, the IHT 10 is encased within a housing comprised of a first housing section 12 and a second housing section 14 joined along a substantially horizontal split line 16. It is to be understood, however, that the IHT described hereinafter may be disposed within a housing comprised of any number of housing sections having split lines in various orientations. Accordingly, the design of the housing illustrated is not meant to be limiting.

The IHT 10 includes a center section 18 having hydraulic porting formed therein on which are mounted a hydraulic pump unit 20 and a hydraulic motor unit 22. The particular arrangement of the center section 18, hydraulic pump unit 20, and hydraulic motor unit 22 may be varied according to space requirements dictated by the size and configuration of the vehicle with which said IMT is to be employed. Specifically, the hydraulic pump unit 20 generally comprises a pump cylinder block 24 having a plurality of piston receiving chambers 26 each of which movably contains a pump piston 28 and piston spring 30. similarly, the hydraulic motor unit generally comprises a motor cylinder block 32 having a plurality of piston receiving chambers 34 each of which movably contains a motor piston 36 and piston spring 38. The hydraulic pump unit 20 is hydraulically connected to the hydraulic motor unit 22 through the hydraulic porting formed in the center section 18.

An input shaft 40, which is driven by the engine of the vehicle (not shown), is drivingly connected to the hydraulic pump unit 20 such that the rotation of the input shaft 40 rotates the pump cylinder block 24 therewith. The rotation of the pump cylinder 24 causes the pump pistons 28 to travel up and down as they travel against a swash plate 42. The swash plate 42 may be moved to a variety of positions to vary the stroke of pump pistons 28; this varies the volume of hydraulic fluid pumped into the hydraulic porting which, in turn, ultimately varies the speed of the hydraulic motor unit 22. Specifically, each motor piston 36 is driven by the pumped hydraulic fluid against a fixed, angularly oriented motor thrust bearing 44 such that the action of the motor pistons 36 against the thrust bearing 44 creates a rotational movement of the motor cylinder block 32. Drivingly connected to the motor cylinder block 32 is a motor shaft 46 which accordingly rotates therewith. a disc brake assembly 47 is also provided and connected to the motor shaft 46.

In the illustrated embodiment, the motor shaft 46 drives a first gear 48 that is drivingly connected to a second reduction gear 50. The reduction gear 50 is drivingly connected to a third, bull gear 52. The bull gear 52 imparts the rotational movement translated through the first and second gears from the motor shaft 46 to the differential assembly 54. It is to be understood, however, that the gear configurations described herein are meant to be illustrative only and that other variations may be employed without departing from the scope of the invention, e.g., the first gear 48 may be arranged to directly drive the bull gear 52 or may be adapted to drive additional gears for the purpose of providing further reduction.

Figure 4:
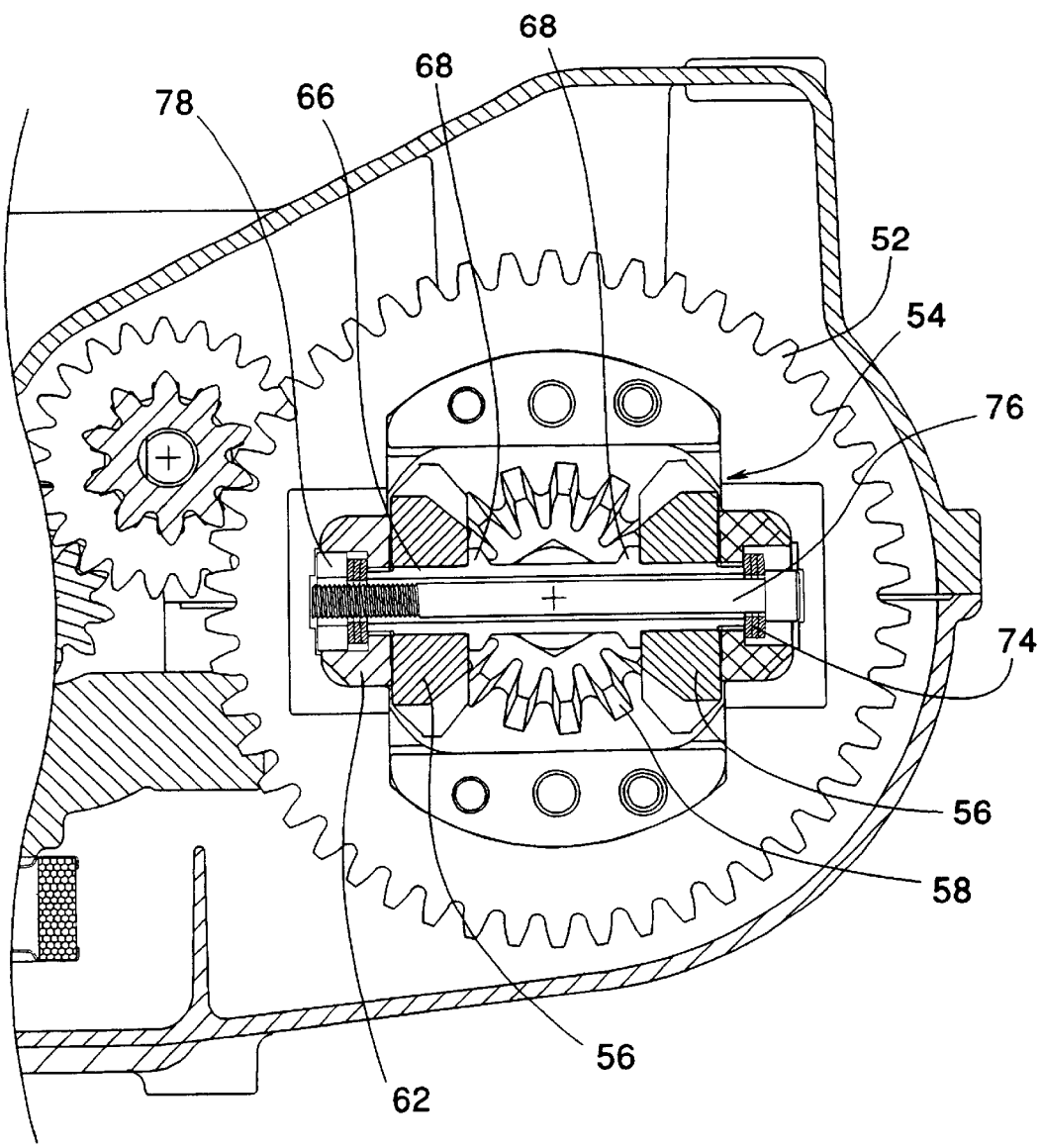
FIG. 4 illustrates a close-up view of the controlled traction differential assembly as illustrated in FIG. 1.
Figure 5:
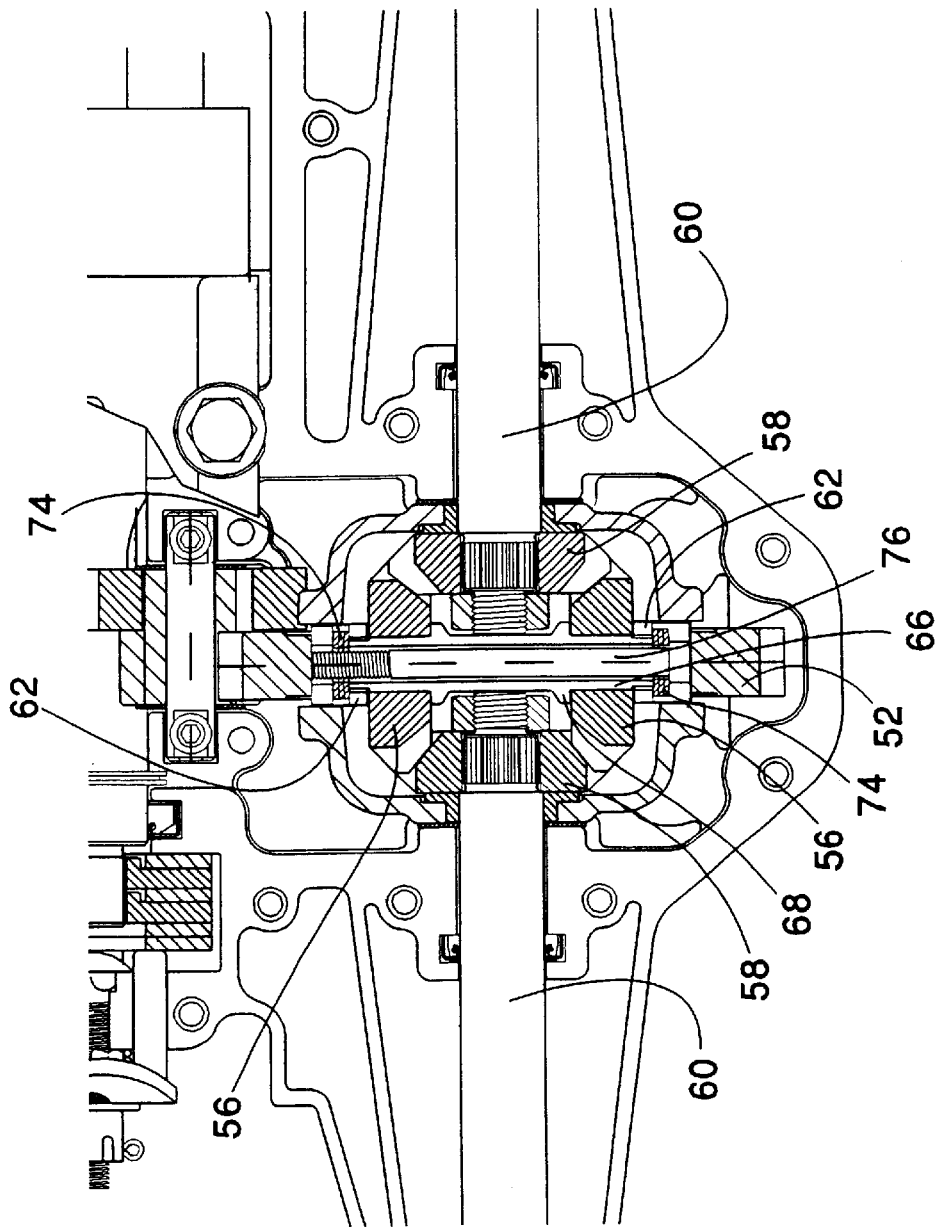
FIG. 5 illustrates a close-up view of the controlled traction differential assembly as illustrated in FIG. 2.

As best seen in FIGS. 4 and 5, the differential assembly 54 generally comprises a pair of bevel planet gears 56 matingly engaged with the bull gear 52 and, accordingly, rotatable therewith. The bevel planet gears 56 are also drivingly connected to a pair of bevel drive gears 58 which are, in turn, drivingly attached to a pair of oppositely disposed axle shafts 60 which comprise the axle. Specifically, the bevel planet gears 56 are engaged with the bull gear 52 through the use of bearing blocks 62 which are received in corresponding mating slots formed therewithin. While the preferred embodiment has been illustrated as utilizing two pairs of bevel gears, it will be appreciated by those of ordinary skill in the art that other gearing arrangements may be utilized.

Figure 6:
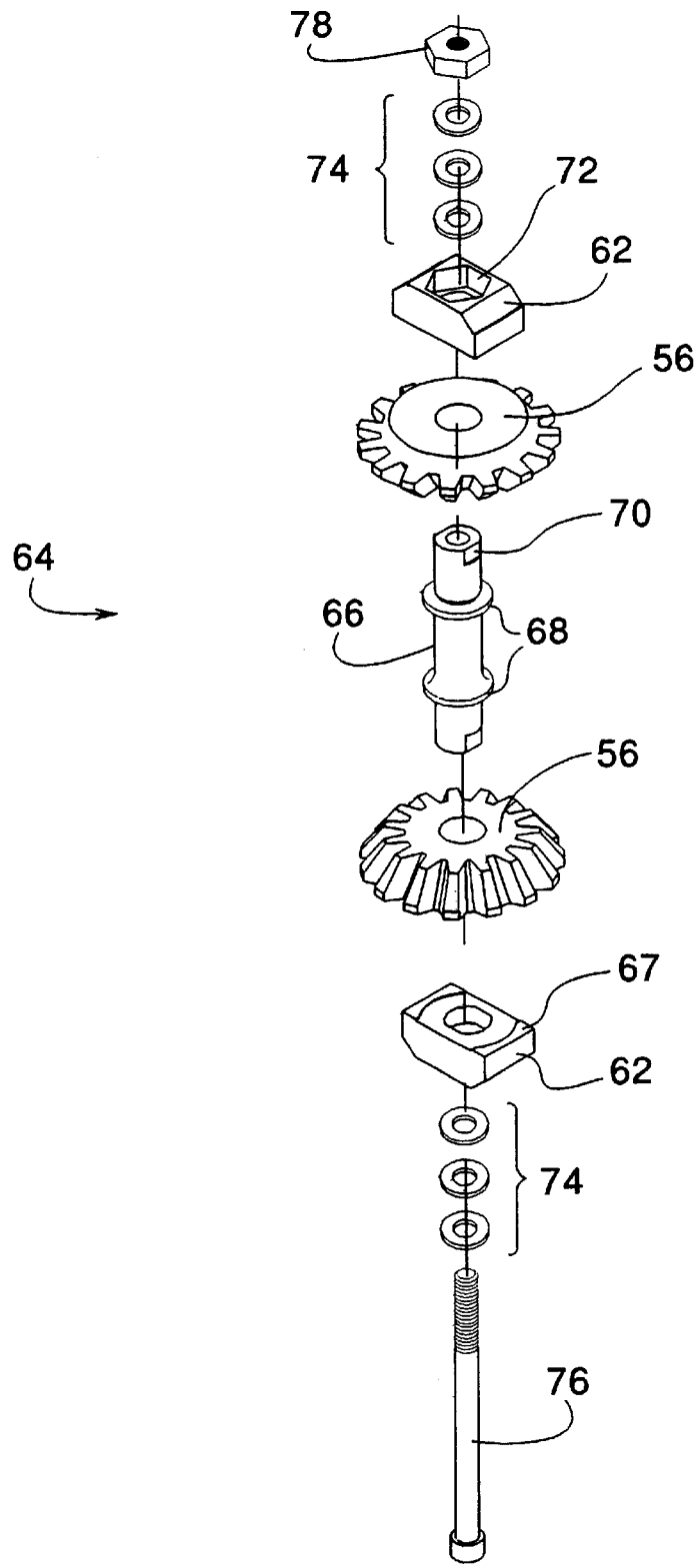
FIG. 6 illustrates an isometric view of the controlled traction differential cartridge used in connection with the invention as illustrated in FIGS. 1–5.
Figure 7:
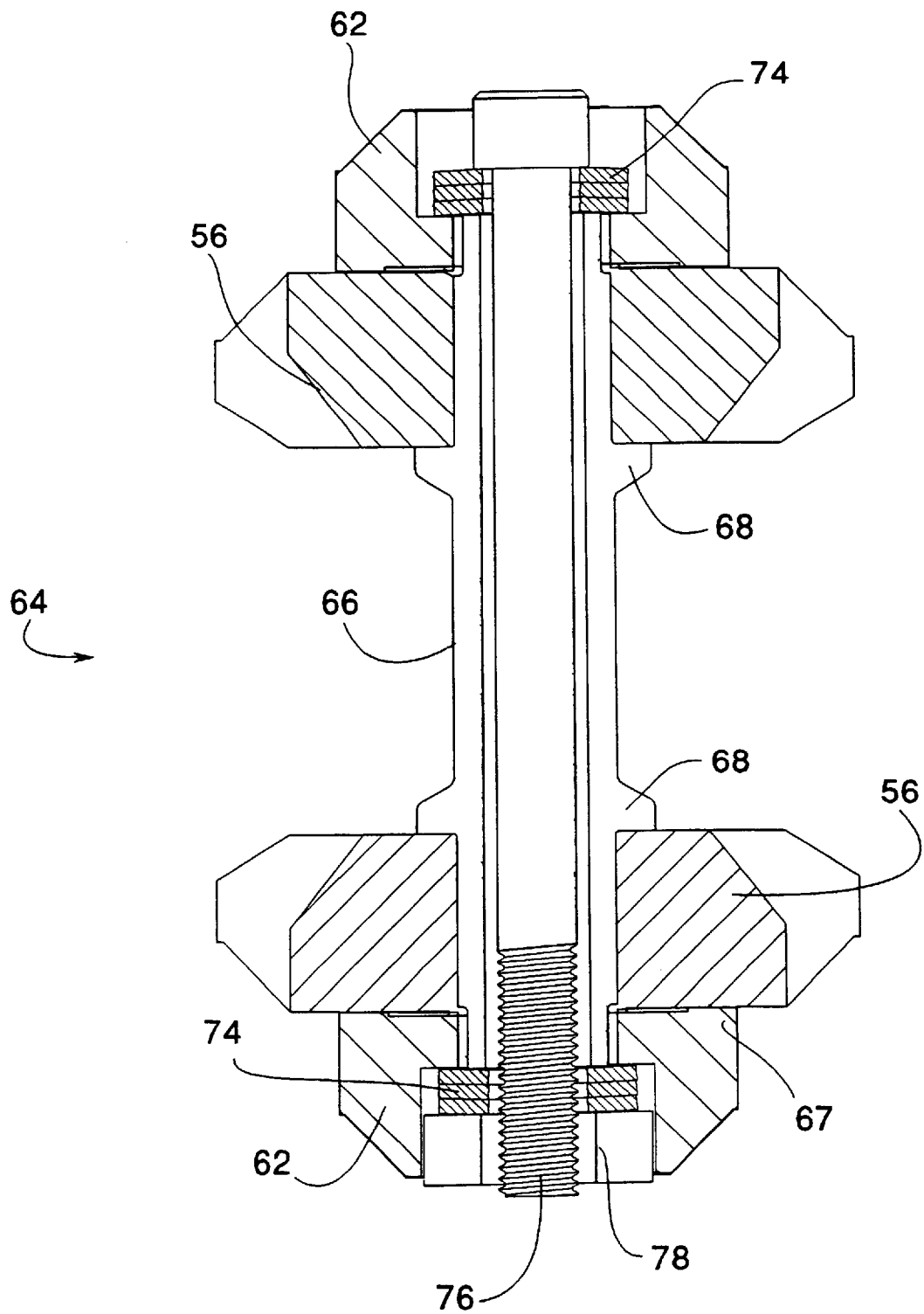
FIG. 7 illustrates a sectional side view of the assembled controlled traction differential cartridge as illustrated in FIG. 6.

Turning to FIGS. 6 and 7, the bevel planet gears 56 and bearing blocks 62 comprise a part of the controlled traction cartridge 64. More specifically, the controlled traction cartridge 64 comprises a shaft 66 which may be a cross shaft, split shaft, or the like. For ease of understanding the shaft 66 shall be simply referred to herein as cross shaft 66. The cross shaft 66 has an axial opening therethrough and a pair of oppositely disposed interior bearing surfaces 68 which may be shoulders formed on the cross shaft 66, retaining rings, or the like. Against the bearing surfaces 68 the bevel planet gears 56 are rotatingly mounted. Additionally, the bearing blocks 62 are also mounted on the cross shaft 66 in communication with the bevel plant gears 56 and provide an exterior bearing surface 67. In the embodiment shown in FIGS. 6 and 7, the exterior bearing surface 67 is generally rectangular in shape and includes two raised opposing exterior bearing surfaces 67a and 67b spaced apart and preferably on opposite sides of the shaft 66, i.e., the shaft 66 is between the two raised bearing surfaces 67a and 67b. Preferably, the ends of the cross shaft 66 are provided with flats 70 which engage a corresponding interior surface provided to the bearing blocks 62 to prevent the rotation of the cross shaft 66 with respect thereto. In further embodiments, the flats 70 could be replaced by a spline, serrations, or other like type of rotation resistant features. The prevention of the rotation of the cross shaft 66 is preferred since it is seen to maximize the force required to rotate the bevel gears with respect to one another. In addition, each of the bearing blocks 62 is provided with a cavity 72 in which is disposed one or more hemispherical spring washers 74.

To maintain the arrangement of the components of the controlled traction cartridge 64 a bolt 76 is utilized. Specifically, the bolt 76 is positioned generally through the center of the above-described components and a nut 78 is affixed thereto which nut 78 is trapped in the cavity 72 in the corresponding bearing block 62. Preferably, the cavity 72 in the corresponding bearing block 62 is adapted to prevent the nut 78 from rotating with respect thereto during assembly while allowing room for the positioning of the spring washers 74 therewithin. To maintain the arrangement of components during operation, it is further preferred that the nut 78 be tacked welded to the bolt 76.

When the controlled traction cartridge 64 is fully assembled, the bolt 76 and nut 78 function to compress the spring washers 74 within the cavities 72 of the bearing blocks 62. Thereafter, the action of the spring washers 74 against this compressive force drives the bearing blocks 62 into increased frictional engagement with the bevel planet gears 56 which are, in turn, also driven into further frictional engagement with the shoulders 68 of the cross shaft 66. This frictional engagement of the bevel planet gears 56 between the bearing blocks 62 and the shoulders 68 functions to inhibit the normal rotational movement of the bevel planet gears 56 which occurs when the transaxle differentials. Specifically, the bevel planet gears 56 will not rotate or differential until the rotational force or torque imparted thereupon by the bevel drive gears 58 is sufficient to overcome the frictional forces created by engagement of the bevel planet gears 56 with the bearing blocks 62 and shoulders 68. In this manner, when one of the drive wheels connected to one of the axle shafts is operating in a condition of reduced friction, the herein described controlled differential assembly will maintain both drive wheels in uniform rotation until such time as the torque created by the drive wheels is sufficient to overcome the frictional forces applied to the bevel planet gears 56. Furthermore the amount of torque required to rotate the bevel planet gears 56 of the differential assembly, the breakdown bias, may be easily adjusted by varying the quantity of spring washers utilized or by using spring washers with different spring constants. Additionally, other components capable of creating similar forces upon the bevel planet gears in the arrangement above-described may be utilized such s wave washers, split washers, or the like.

While specific embodiments of the invention have been described in detail, it will be appreciated by those skilled in the art that various modifications and alternatives to those details could be developed in light of the overall teachings of the disclosure. For example, the arrangement disclosed herein may be modified whereby the frictional force is applied to only one of the bevel planet gears. In this manner controlled traction may still be achieved. Accordingly, the particular arrangements disclosed are meant to be illustrative only and not limiting as to the scope of the invention which is to be given the full breadth of the appended claims and any equivalent thereof.

What is claimed is:

1. A hydrostatic transaxle comprising:
   a housing;
   a hydrostatic transmission mounted in said housing including a hydraulic pump unit and a motor unit;
   a motor shaft drivingly connected to said hydraulic motor unit;
   a differential assembly drivingly connected to said motor shaft and comprising a first bevel gear restrictively rotatably positioned between a first interior bearing surface and a first exterior bearing surface, wherein the first exterior bearing surface is axially compressed toward the first interior bearing surface; a first biasing mechanism for axially compressing the first exterior bearing surface toward the first interior bearing surface; a second bevel gear restrictively rotatably positioned between a second interior bearing surface and a second exterior bearing surface, wherein the second exterior bearing surface is axially compressed toward the second interior bearing surface; and a second biasing mechanism for axially compressing the second exterior bearing surface toward the second exterior bearing surface; and
   a pair of axle shafts drivingly engaged to said differential assembly.

2. The transaxle of claim 1, wherein said first and second biasing mechanism comprise springs.

3. A hydrostatic transaxle including a drive axle comprising:
   a housing having a hydraulic pump and motor mounted therein;
   a motor shaft connected to the hydraulic motor;
   a differential comprising a bull gear connected to the motor shaft and a controlled traction cartridge, said controlled traction cartridge comprising a shaft in the plane perpendicular to the drive axle, a gear mounted on the shaft, and a friction member mounted on the shaft and rotatably fixed relative to the shaft, wherein the friction member matingly engages the bull gear.

4. The transaxle of claim 3, wherein said friction member comprises a bearing block.

5. The transaxle of claim 4, wherein said friction member has an exterior surface which is generally rectangular in shape, the exterior surface including two raised bearing surfaces.

6. The transaxle of claim 4, wherein the cartridge comprises an interior bearing surface associated with the shaft and said gear is compressed between said bearing block and said interior bearing surface.

7. The transaxle of claim 3, wherein the cartridge further comprises a spring axially aligned with the shaft, wherein the spring is positioned to apply force to the gear.

8. The transaxle of claim 7, wherein the friction member is translatable along the shaft, wherein the cartridge comprises an interior bearing surface positioned along the shaft, and wherein the gear is positioned between the friction member and the interior bearing surface.

9. The transaxle of claim 8, wherein the interior bearing surface is fixed relative to the shaft.

10. The transaxle of claim 8, wherein the interior bearing surface comprises shoulders formed on the shaft.

11. The transaxle of claim 3, further comprising an input shaft engaged to said pump, wherein said motor shaft is mounted generally perpendicular to said input shaft, and said pump and motor are mounted on a center section.

12. A hydrostatic transaxle for a vehicle having an engine comprising a housing;

a hydrostatic transmission mounted in said housing and comprising a pump and a motor mounted on a center section, wherein said pump is driven by an input shaft;

a motor shaft drivingly engaged to said hydrostatic transmission, wherein said motor shaft is mounted generally perpendicular to said input shaft; and a differential assembly comprising a shaft, a gear rotatably mounted on said shaft, a friction member movable along said shaft, an interior bearing surface against which said gear is forced by said friction member whereby the rotation of said gear is frictionally inhibited, and a spring positioned to force said friction member toward said gear.

13. The transaxle of claim 12, wherein said friction member has an exterior surface which is generally rectangular in shape, the exterior surface including two raised bearing surfaces.

* * * * *